United States Patent [19]

Savin

[11] Patent Number: 5,413,628
[45] Date of Patent: *May 9, 1995

[54] STABLE INORGANIC ZINC-POWDER RICH COATING COMPOSITION

[76] Inventor: Ronald R. Savin, 11001 Muirfield Dr., Rancho Mirage, Calif. 92270

[*] Notice: The portion of the term of this patent subsequent to Aug. 16, 2011 has been disclaimed.

[21] Appl. No.: 287,913

[22] Filed: Aug. 9, 1994

Related U.S. Application Data

[63] Continuation-in-part of Ser. No. 125,430, Sep. 22, 1993, Pat. No. 5,338,348.

[51] Int. Cl.$^6$ ............................ C09D 5/10; C08K 3/08
[52] U.S. Cl. ..................... 106/14.44; 106/14.05; 106/14.41; 106/14.43; 523/220; 523/442; 523/443; 523/459; 524/379; 524/391; 524/439; 524/492; 524/493
[58] Field of Search ............... 106/14.44, 14.05, 14.41, 106/14.43; 523/220, 442, 443, 459; 524/379, 391, 439, 492, 493

[56] References Cited

U.S. PATENT DOCUMENTS

| | | | |
|---|---|---|---|
| 4,417,007 | 11/1983 | Salensky et al. | 523/422 |
| 4,891,394 | 1/1990 | Savin | 523/422 |
| 5,098,938 | 3/1992 | Savin | 523/220 |
| 5,167,701 | 12/1992 | Savin | 106/14.41 |
| 5,200,057 | 4/1993 | Canaris | 106/1.29 |
| 5,248,406 | 9/1993 | Kamitani | 106/1.29 |
| 5,338,348 | 8/1994 | Savin | 106/14.44 |

FOREIGN PATENT DOCUMENTS

| | | | |
|---|---|---|---|
| 2065828 | 10/1992 | Canada . | |
| 2074329 | 1/1993 | Canada . | |
| 2602239 | 7/1986 | France . | |
| 57-192471 | 11/1982 | Japan | 106/14.05 |
| 2155047 | 9/1985 | United Kingdom | 106/1.29 |

*Primary Examiner*—Anthony Green
*Attorney, Agent, or Firm*—Dinsmore & Shohl

[57] ABSTRACT

A stable coating composition for use in protecting metallic substrates from corrosion, comprising in weight percent, based on the total weight of the composition: from about 7% to 35% of alkyl silicate as a film forming substance; from about 35% to 55% of zinc powder; from about 5% to 25% of zinc flakes; from about 0.2 to 5% of at least one amorphous silica; and up to about 30% particulate ferrophosphate; wherein the alkyl silicate comprises, in weight percent, based on the weight of the alkyl silicate: from about 5% to 20% of tetraethyl orthosilicate.

4 Claims, No Drawings

STABLE INORGANIC ZINC-POWDER RICH COATING COMPOSITION

This is a continuation-in-part application of application Ser. No. 08/125,430, filed Sep. 22, 1993 (now U.S. Pat. No. 5,338,348, issued Aug. 16, 1994).

FIELD OF THE INVENTION

This invention relates to a coating composition which provides improved stability during the manufacture and packaging of the coating. This invention relates to a coating composition with improved shelf life prior to use and for the unused portion after the first use. Particularly, this invention relates to an inorganic, zinc powder-rich coating composition which satisfies the objects set forth herein.

BACKGROUND OF THE INVENTION

The outstanding corrosion resistance afforded by galvanizing has made it the most effective means for the long term protection of steel from oxidation (rusting) and subsequent corrosion. It is the conventional method of providing protection for guardrails, transmission towers, light poles, electrical equipment and dozens of other specific applications. Five mils or 125 microns of a galvanizing composition applied to light poles and transmission towers will protect exposed equipment for a period in excess of 20 years. Guardrails may be coated with an average deposition of 75 microns which provides approximately 10 years of corrosion protection in an average rainfall environment. Galvanizing compositions are applied both by hot dipping and electroplating, in applications where surface coatings do not provide adequate corrosion resistance.

Galvanizing compositions are made from zinc "ingots" and become oxidized only when exposed to the elements. The high conductivity of galvanizing compositions provides excellent cathodic corrosion protection to steel (which acts as the cathode, zinc being the anode), when exposed to a saline environment or other forms of oxidation caused primarily by water in its various forms: moisture, vapor and ice.

Zinc dust rich primers having an inorganic binder or vehicle have been in use for about 40 years. Typically such compositions contain about 80% to about 95% by weight zinc dust, and alkyl silicate has been the inorganic binder of choice. Single-package primer compositions containing about 80% to about 90% by weight zinc dust and ethyl silicate binder have been in use for about the last 20 years.

A brochure published by AKZO N.V. (publication date unknown) discusses the development of zinc rich primers, the preparation of ethyl silicate and its use and mechanism as a binder. This publication explains that ethyl silicate is derived from tetraethyl orthosilicate which is reacted with water in the presence of an organic solvent to produce liquid polysiloxane resins. When used in a zinc rich primer, evaporation of the solvent after application of the coating results in transformation of the polysiloxane resin to amorphous silica, which becomes the bonding film in the cured coating. The amorphous silica reacts chemically with some of the zinc powder in the coating to form zinc silicate compounds. The silica will also react with the ferrous metal substrate, particularly if it is previously abraded or sandblasted, to form iron-(zinc)-silicate bonds. Silicate mineral extenders frequently used in zinc rich primers are also believed to react chemically in such inorganic systems. The resulting bonding matrix allows a controlled galvanic current flow between the ferrous substrate and the zinc pigment (cathodic and anodic to one another, respectively), thus providing long term galvanic protection, including scratched or abraded bare areas of substrate due to adjacent zinc metal.

U.S. Pat. No. 4,417,007, issued Nov. 22, 1983, to Salensky et al., discloses a zinc rich paint formulation containing manganomanganic oxide as a color pigment, in which the binder may be any one of (1) epoxy resins, (2) that derived by reaction from diglycidyl ether of bisphenol A and vegetable oil fatty acids, (3) that derived from bisphenol A and epichlorohydrin, or (4) alkyl silicate. From about 43% to 90% by weight zinc dust, and from about 3% to 38% manganomanganic oxide are present, along with from about 4% to 25% by weight epoxy resin binder, 0 to about 35% by weight pigment extenders and binders, 0 to about 5% by weight of a pigment suspension agent and balance solvent, in a claimed embodiment.

U.S. Pat. No. 4,891,394, issued Jan. 1990, to R. R. Savin, discloses a coating composition comprising about 10% to about 25% by weight of a film-forming polymer which may be an epoxy resin, a vinyl chloride resin copolymerized with polyisocyanates, or a vinyl chloride resin copolymerized with melamines; about 30% to about 60% by weight particulate metallic zinc (zinc dust as explained more fully below); a crystalline silica having an oil absorption value of less than 20 measured by ASTM Test D281-84, the volumetric ratio of such silica to zinc ranging from about 0.7:1 to about 1.25:1; about 2% to about 3% by weight of a pyrogenic amorphous silica having an average particle size less than about 0.012 micron (for control of rheological characteristics); and at least one solvent for the film-forming polymer.

French Patent 8611238 (Publication No. 2,602,239), published Feb. 1988, in the name of R. R. Savin, discloses a two part coating composition containing up to 70% by weight of a powdered metal (based on the total weight after admixture) (metal dust as explained more fully below); about 2% to 30% by weight of a film-forming polymer (as an organic binder); about 2% to about 30% of a hardener for the polymer; at least 1.8% and up to 30% of an agent for control of rheological characteristics; and up to 30% organic solvents. A preferred polymer is an epoxy resin having an average molecular weight of 350 to 3800. The agent for control of rheological characteristics includes at least one pyrogenic silica and optionally at least one natural or transformation silica having an oil absorption value preferably not greater than 90 and more preferably not greater than 40.

U.S. Pat. No. 5,098,938, issued March 1992, to R. R. Savin, discloses a coating composition similar to that of the above-mentioned U.S. Pat. No. 4,891,394, wherein an epoxy resin film-forming binder is used, and wherein at least four different size grades of pyrogenic amorphous silicas are present within specified proportions and average particle sizes, together with a crystalline silica having an oil absorption value of less than 20 measured by ASTM Test D281-84.

Canadian Patent 2,065,828 provides a waterborne zinc rich anticorrosion primer which is based upon the combination of metallic zinc dust with a stable aqueous dispersion of a particular chlorinated addition copolymer. Such primer can be formulated without the need for significant amounts of organic co-solvents. These primers readily cure at ambient temperatures, allow overcoating shortly after drying, and result in films of desirable hardness, resiliency and adhesion both to the substrate and topcoat.

Canadian Patent 2,074,329 relates to an improved powder coating composition comprising (a) a resin, (b) a curing agent and (c) zinc, wherein the zinc is a mixture of (c 1) lamellar zinc (zinc flakes) and (c2) zinc dust.

U.S. Pat. No. 5,167,701 issued December 1992, to R. R. Savin, discloses a one-package zinc rich coating composition having an inorganic binder, which protects metallic substrates against environmental attack, comprising, in volume percent: from about 55% to about 60% of an alkyl silicate solution having a solids content of about 35% to about 45% by weight; about 10% to about 14% zinc dust of at least one different particle size grade; about 0.5% to about 2.5% zinc flakes; about 3% to about 6% particulate ferrophosphate; about 10% to about 17% of a particulate crystalline silica having an oil absorption value of less than 20 measured by ASTM Test D 281-84; about 1% to about 2.5% of at least two different size grades of pyrogenic amorphous silicas having average particle sizes ranging from about 0.007 to about 0.04 micron; about 0.3% to about 0.5% of a wetting agent; and about 7% to about 8% of an anhydrous alcohol solvent.

Coatings made from zinc dust provide only limited protection to bare metal due to its much lower conductivity than zinc metal caused by oxidation during its manufacturing process. In conventional zinc rich paints, the greater the conductivity the greater the area of adjacent bare steel that will be protected by the zinc metal. The level of adjacent bare metal protection is largely proportional to its conductivity measured in ohms/cm$^2$. All galvanizing compositions, prior to exposure, will measure total conductivity of 0.00 ohm/cm$^2$ at 75 micron deposition, whereas zinc rich industrial and maintenance coatings will measure from 1 to several dozen ohms/cm$^2$ at 75 microns based on the percentage of zinc dust and the particle size of the zinc dust utilized. In order to provide adequate cathodic continuity, zinc incorporated in primers customarily contains between 80-95 weight % of zinc dust to the binder including additives. The high percentage of zinc dust provides improved conductivity contributing improved cathodic protection, however, the high density and low binder content causes serious problems in handling and poor substrate adhesion, requiring the substrate to be sand blasted metal to obtain adequate adhesion.

Another consideration is that inorganic zinc rich coating compositions are difficult to manufacture and store because of the irreversible curing mechanism triggered by exposure to moisture. Once the zinc dust has been added to a one package zinc primer in the manufacturing process, the moisture curing mechanism is activated. Exposure to a minimum relative humidity of 50% effectively cures these inorganic zinc rich coatings. Any exposure to moisture in the manufacturing or packaging process will destabilize the primer by premature curing, resulting in a product that will gel in the container in about two days. These coatings have therefore been manufactured in inert environments, using nitrogen blankets to prevent moisture contamination. One package longer shelflife zinc primer coatings have been marketed in small volumes, since the nitrogen blanketing equipment necessary to produce such coatings in a stable form, is specialized and expensive.

Despite the sensitivity to moisture, inorganic zinc rich coating compositions have been suggested for topcoating to prevent corrosion. Topcoating, application of barrier coatings which have high electrical resistance and low water permeability, is suggested by T. K. Janes in the article "Performance of Zinc Dust in an Epoxy Polyamide Coating." Janes states that even with topcoating, breaks in the film will allow corrosion, a problem common in prior art zinc coatings due to the porosity of the film.

Zinc powder has rarely been used in zinc rich coating systems and has been ignored as an acceptable pigment due to its large particle size and heavy sedimentation problems. This application involves the use of zinc powder in a stable coating composition as a low cost galvanized metal replacement. Its relatively larger particle size permits excellent topcoat adhesion, while galvanizing generally requires pre-treatment such as acid etching or special wash primers to provide adequate adhesion. Most galvanized metal is normally not coated due to the cost involved in the pre-treatment and the application of a topcoat in field conditions. While the term "zinc powder" has been and continues to be used interchangeably with "zinc dust", as used herein "zinc powder" only means pulverized metallic zinc in granular form, which is different from "zinc dust", from "zinc powder" and from "particulate zinc ", as these terms are generally understood. As used herein "zinc powder" also is different from "lamellar zinc" or "zinc flakes", as used in the Canadian Patent 2,074,329.

Thus, there is a genuine need for a cost effective zinc-powder rich coating composition which provides the stability lacking in prior art coatings, while affording all the advantages of galvanizing and prior art zinc-powder rich coating materials.

SUMMARY OF THE INVENTION

It is a primary object of the present invention to provide an inorganic zinc-powder rich coating composition which provides improved stability for manufacturing, packaging and repackaging applications.

It is another object of the present invention to provide a coating composition which remains stable after activation of the moisture curing mechanism and is stable during shelf life.

It is a further object of the present invention to provide a coating composition which remains stable when exposed to moisture.

It is yet another object of the present invention to provide a one package shelf life coating composition which can be produced and stored, without gelling, in large volumes.

In accordance with the present invention there is provided, in a coating composition for use in protecting metallic substrates from corrosion, comprising in weight percent, based on the total weight of the composition: from about 7% to 35% of alkyl silicate as a film forming substance; from about 35% to 55% of zinc powder; from about 5% to 25% of zinc flakes; from about 0.2 to 5% of at least one amorphous silica; and up to about 30% particulate ferrophosphate; the improvement wherein the alkyl silicate comprises, in weight percent, based on the weight of the alkyl silicate, from about 10% to 20% of tetraethyl orthosilicate.

DETAILED DESCRIPTION OF THE INVENTION

The film forming substances of the preferred embodiments of the present invention are selected from the group consisting of alkyl silicate in substantially anhydrous alkyl alcohol as a solvent, epoxy resins (powder and non-powder) and other well known equivalents thereof including vinyl chloride resins copolymerized with isocyanates, polyurethane resins, polyester resins, oil-modified polyester resins, polymers of acrylic, methacrylic esters and waterborne urethane or an emulsion polymer prepared by the polymerization of monomers selected from the group consisting of acrylic, methacrylic, vinyl or styrenic monomers, and mixtures thereof. Preferably the alkyl silicate solution is ethyl silicate in ethanol as a solvent.

The presence of amorphous silica is necessary for soft settling or sedimentation in the one-package composition of this invention.

Moving line applications are readily accomplished with the composition of the invention, and setting of deposited coatings can be accelerated if desired by subjecting the deposited coating to steam. Drying can be effected in about 5 minutes by this technique. Application of coatings can be carried out by brushing, spraying or flowcoating. Coating thicknesses can range from about 1.5 to about 5 mils.

Zinc powder is used as a low cost galvanized metal replacement. Its relatively larger particle size permits excellent topcoat adhesion while galvanizing generally requires pretreatment such as acid etching or special wash primers to provide adequate adhesion. Most galvanized metal is normally not coated due to the cost involved in the pre-treatment and the application of a topcoat in field conditions.

As indicated in the above-mentioned AKZO publication, conventional zinc rich coating compositions contained from about 80% to about 90% by weight zinc dust. In contrast to this, by substitution of the silica and ferrophosphate in place of part of the zinc dust in conventional inorganic binder compositions, the composition of the present invention contains about 35% to about 55% by weight zinc powder and 5% to 25% zinc flakes, thus substantially reducing the density and cost of the product while at the same time achieving excellent protection of metallic substrates against environmental attack. A dispersing agent may be used to provide increased distribution of the zinc powder.

Ferrophosphate improves electrical conductivity by increasing the distribution of zinc powder when present within the broad range of up to about 30% by weight. Ferrophosphate is a relatively low cost material.

Zinc flakes, which are somewhat fibrous in shape (an aspect ratio of about 11:1), have high electrical conductivity in comparison to zinc dust. The presence of zinc flakes is thus needed within the broad range of about 5% to about 25% by volume.

The amorphous silica is needed to provide soft sedimentation and to improve resistance against environmental attack. Amorphous silica makes the composition of the invention thixotropic, providing ease of application. The sedimentation catalyst works in conjunction with the amorphous silica to produce soft sedimentation.

A wetting agent, if present, improves coatability of untreated substrates and adhesion of dried coatings, reduces surface tension and eases grind.

The amount of anhydrous alcohol solvent is restricted to a maximum of about 8% by volume, in order to maintain the total volatile organic content (VOC), including the solvent present in the alkyl silicate solution, below the amount permitted by federal regulations.

The present invention is specifically directed towards the discovery by the applicant that the use of tetraethyl orthosilicate (an inorganic solvent), within the range of about 5% to about 20% based on the weight of the film forming substance, resists moisture and provides stability to the coating composition. Tetraethyl orthosilicate prevents the moisture-zinc-ethyl silicate reaction that causes the coating material to gel and is manufactured by Silbond Corp. under the trade name "SILBOND ® Pure." SILBOND ® Pure has few restrictions, if any, on its use with respect to Federal, State or local environmental laws or regulations. "SILBOND ® Pure also evaporates rapidly from the coating and is thereby very effective in helping to meet stringent new VOC standards (greater the amount of inorganic " SILBOND ® Pure used less volatiles are required).

A substantially anhydrous ethyl silicate solution in ethanol containing 35% ethyl polysilicate, 52% ethylene glycol monoethyl ether and 13% ethanol (about 40% by weight solids), which is suitable for use in the present invention, is sold by Silbond Corp. under the tradename "SILBOND ® H-12A ".

Zinc powder is available from the Zinc Corporation of America (ZCA). Flake zinc having an average particle size of about 0.9 micron wide and 10 micron long is sold by Novamet Corp.

Ferrophosphate having an average particle size of about 10 microns, suitable for use in this invention, is available from Oxychem.

Amorphous silica may be produced by high temperature hydrolysis of silicon tetrachloride or by transformation of silica in an electric arc. Preferred pyrogenic amorphous silicas include those sold under the trademark "AEROSIL" by Degussa, and under the trademark "CABOSIL" by Cabot Corporation. "AEROSIL" 300 has an average particle size of about 0.007 micron.

A suitable nonionic wetting agent is sold by BYK Chemie under the trademark "DISPERSNIK 181". A suitable sedimentation catalyst used in conjunction with "AEROSIL" or "CABOSIL" is sold by BYK Chemie under the trademark "ANTI-TERRA 204". 3M produces hollow glass microspheres under the trademark "ZEOSPHERES 200". These microspheres disperse the zinc powder and aid in effectively drying the coating when 50% relative humidity is not present.

The following non-limiting example embodies a composition of the invention.

EXAMPLE 1

An inorganic zinc-powder rich composition was prepared by mixing the components in a conventional paint mill, the quantities being in percent by weight based on the total weight:

| | |
|---|---|
| Ethyl silicate solution (35% ethyl polysilicate, 52% ethylene glycol monoethyl ether and 13% ethanol)[1] (40% by weight solids) | 26.2% |
| Tetraethyl orthosilicate[2] | 2.7 |
| Zinc powder 1213 | 26.5 |
| Zinc powder 1222 | 17.0 |
| Zinc flakes (0.9 × 10 microns)[3] | 3.0 |

-continued

| | |
|---|---|
| Ferrophosphate (10 microns)[4] | 17.0 |
| Dispersing agent[5] | 5.5 |
| Sedimentation catalyst[6] | 0.25 |
| Amorphous silica (0.007 micron)[7] | 1.1 |
| Wetting agent[8] | 0.25 |
| | 100.0% |

[1] Silbond Corp. "Silbond H-12A"
[2] Silbond Corp. "Pure Silbond"
[3] Novamet Corp.
[4] Ferrophos 31 by Oxychem
[5] "Zeospheres 200" by 3M
[6] BYK Chemie "ANTI-TERRA 204" nonionic
[7] Degussa "AEROSIL" 300 amorphous silica
[8] "Dispersnik 181" by BYK Chemie The composition of the invention and coatings deposited therefrom had the following properties: the composition was thixotropic and non-settling; application was easily effected by brushing, spraying and flowcoating; solvent resistance was excellent; and resistance against saltspray, saltfog and condensing humidity corrosion was about equal to the prior art coatings. The coatings deposited from the present invention met the ASTM B-117 specification.

The composition of the present invention showed stability beyond that of prior art coatings. The tetraethyl orthosilicate of example 1, though miscible for short periods of mixing during application (two to three hours), floated to the surface of the container upon packaging/repackaging preventing the moisture-zinc-ethyl silicate reaction for approximately nine months. This stability despite exposure to moisture overcomes the issues of manufacturing, packaging and shelf life presented in the prior art.

Thus it is apparent that there has been provided, in accordance with the invention, a stable inorganic zinc-powder rich coating composition which fully satisfies the objectives and advantages set forth above. While the invention has been described in conjunction with specific embodiments thereof, it is evident that many alternatives, modifications, and variations will be apparent to those skilled in the art in light of the foregoing description. Thus, instead of the alkyl silicate film-forming substance of the present invention, one may use a film-forming substance selected form the group consisting of powder and non-powder epoxy resins, vinyl chloride resins copolymerized with isocyanates, polyurethane resins, polyester resins, polymers of acrylic, methacrylic esters and waterborne urethane, emulsion polymers prepared by the polymerization of monomers selected from the group consisting of acrylic, methacrylic, vinyl or styrenic monomers and mixtures thereof, and mixtures thereof. Accordingly, it is intended to embrace all such alternatives, modifications and variations which fall within the spirit and broad scope of the appended claims.

I claim:

1. In a coating composition for use in protecting metallic substrates from corrosion, comprising in weight percent, based on the total weight of the composition: from about 7% to 35% of alkyl silicate as a film forming substance; from about 35% to 55% of zinc powder; from about 5% to 25% of zinc flakes; from about 0.2 to 5% of at least one amorphous silica; and up to about 30% particulate ferrophosphate; the improvement wherein the alkyl silicate comprises, in weight percent, based on the weight of the alkyl silicate:

from about 5% to 20% of tetraethyl orthosilicate.

2. The composition of claim 1, wherein said alkyl silicate comprises:

20 to 30 weight percent, based on the total weight of the composition, of an ethyl silicate solution consisting essentially of 35% ethyl polysilicate, 52% ethylene glycol monoethyl ether and 13% ethanol; and 2 to 3 weight percent, based on the total weight of the composition, of tetraethyl orthosilicate.

3. The composition of claim 1, said composition further comprising:

from about 0.1% to 0.5% of wetting agent;
   from about 3% to 15% of dispersing agent; and
   from about 0.1% to 0.5% of sedimentation catalyst.

4. The composition of claim 1, wherein said composition is a one package coating composition.

* * * * *